Nov. 14, 1950     M. S. POLLOCK ET AL     2,529,628
EDUCATIONAL FLAG
Filed Oct. 3, 1949
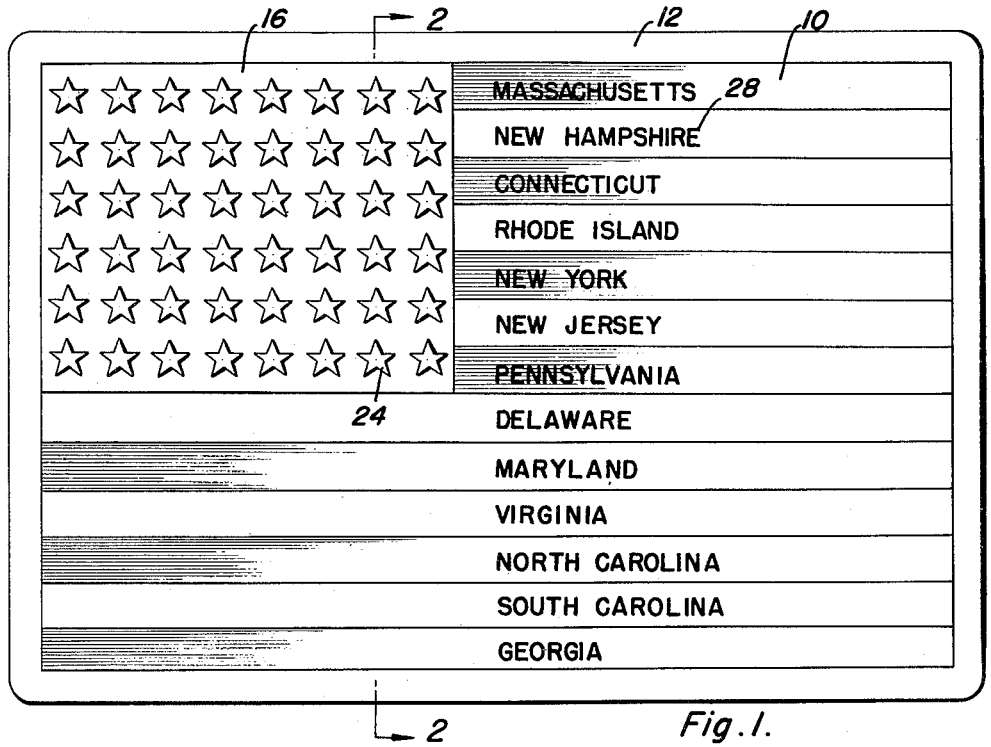
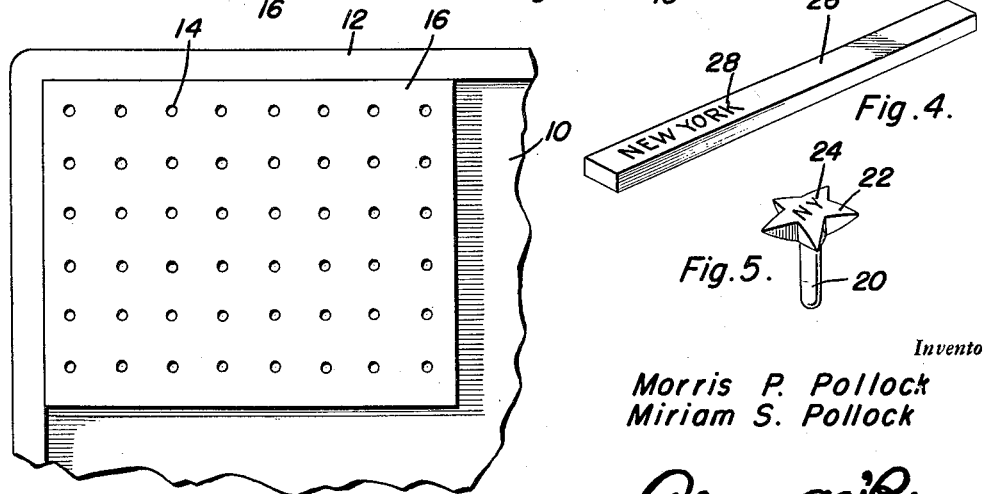
Inventors
Morris P. Pollock
Miriam S. Pollock
By Clarence A. O'Brien
and Harvey B. Jacobson
Attorneys Patented Nov. 14, 1950

2,529,628

UNITED STATES PATENT OFFICE 2,529,628

EDUCATIONAL FLAG

Miriam S. Pollock and Morris P. Pollock, Brookline, Mass.

Application October 3, 1949, Serial No. 119,301

2 Claims. (Cl. 35—73)

This invention relates to an educational device in the form of a peg board and puzzle designed primarily for use by children aged four to ten years.

The primary object of this invention is to provide an educational device for teaching the construction of the American flag which will develop muscular coordination and judgment, develop observation by comparison to the flag, attract attention to the component parts of the flag, teach the names of the thirteen original colonies, teach the names and abbreviations of the forty-eight states, and awaken an interest in the history and geography of the United States.

Another object of this invention is to provide an educational puzzle for teaching the construction and component parts of the American flag comprising a substantially rectangular base, a blue field on said base, a plurality of holes in said field arranged to form a rectangular portion at one corner thereof, pegs removably receivable in said holes, and red and white slats removably receivable on the remaining portion of said field.

These, together with various ancillary objects and features of the invention which will later become apparent as the following description proceeds, are attained by the device, a preferred embodiment of which has been illustrated, by way of example only, in the accompanying drawings, wherein:

Figure 1 is a top plan view of the device shown completely assembled;

Figure 2 is a sectional view taken substantially in the plane of section line 2—2 of Figure 1;

Figure 3 is a fragmentary top plan view of the device shown in Figure 1 with the star-shaped pegs removed;

Figure 4 is a perspective view of one of the slats; and

Figure 5 is a perspective view of one of the pegs.

Specific reference will now be made to the drawings. In the several views, in the accompanying drawings and in the following specification, similar reference characters indicate corresponding elements throughout.

The device of the instant invention is relatively simple in design and construction so that the puzzle may be executed with a minimum of manipulative skill on the part of children in the age group of from four to ten years. The device consists of a substantially rectangular base member 10, preferably of beaver-board construction having a peripheral rim 12. The base member is suitably painted to provide a blue field.

In the upper, left-hand corner of the base member is provided a plurality of apertures 14, which are forty-eight in number, and which are arranged to form a substantially rectangular portion of the field. The apertures 14 may be provided directly in the base member 10 or in a rectangular platform 16 secured to the upper, left-hand corner of the base member. For each of the holes 14 is a corresponding peg 18 which may be fabricated of wood, plastics, or metals. The peg includes a shaft 20 removably receivable in one of the holes 14 and on the top of the shaft 20 is a star-shaped head 22 upon which is impressed or disposed an abbreviation 24 of each of the forty-eight states of the Union.

A plurality of elongated, substantially rectangular slats 26 are provided, which are thirteen in number, seven of which are colored red and six of which are colored white. Each of the slats 26 has impressed or disposed thereon the complete name 28 of each of the original thirteen colonies. Six of the slats are of a length equal to the entire length of the base member or platform, while the remaining seven of the slats are of a length equal to the length of the base member or platform minus the length of the rectangular platform or portion 16, as will be readily understood with reference to Figure 1. The slats may be fabricated of red and white plastic or rubber tile and correspond to the stripes of the American flag.

In use, when the pegs 18 are positioned in proper order within the holes 14 and the slats 26 are slid upon the base member to occupy the proper position and arrangement thereon, a true and exact replica of the American flag will be reproduced by the child. This manipulation will teach the child the detailed components of the American flag and their proper arrangement thereon.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. An educational puzzle for teaching the construction and component parts of the American flag comprising a substantially rectangular base, a blue field on said base, a plurality of holes in said field arranged to form a rectangular portion at one corner thereof, pegs removably receivable in said holes, and red and white slats removably receivable on the remaining portion of said field, forty-eight holes being provided and said pegs including star-shaped heads each having an abbreviation of one of the states disposed thereon.

2. The combination of claim 1 wherein each of said slats includes the complete name of one of the original thirteen colonies, several of the slats being of a length equal to the entire length of said field, and the remainder of the slats being of a length equal to the length of said field minus the portion occupied by the holes.

MIRIAM S. POLLOCK.
MORRIS P. POLLOCK.

REFERENCES CITED

The following references are of record in the file of this patent:

UNITED STATES PATENTS

| Number | Name | Date |
| --- | --- | --- |
| 266,628 | Hyde | Oct. 31, 1882 |
| 1,339,251 | Yonemoto | May 4, 1920 |
| 1,573,358 | Ross | Feb. 16, 1926 |
| 1,652,152 | Bible | Dec. 6, 1927 |
| 1,856,650 | McLintock et al. | May 3, 1932 |